United States Patent
Kitayama et al.

(10) Patent No.: US 7,330,229 B2
(45) Date of Patent: Feb. 12, 2008

(54) COLOR FILTER AND LIQUID CRYSTAL DISPLAY DEVICE USING THE SAME

(75) Inventors: Masae Kitayama, Mie (JP); Koji Matsuoka, Mie (JP); Yukio Yoshida, Mie (JP); Tsuyoshi Tokuda, Mie (JP); Toshihide Tsubata, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/812,646

(22) Filed: Jun. 20, 2007

(65) Prior Publication Data

US 2007/0247569 A1 Oct. 25, 2007

Related U.S. Application Data

(62) Division of application No. 10/958,387, filed on Oct. 6, 2004, now Pat. No. 7,248,313.

(30) Foreign Application Priority Data

Oct. 7, 2003 (JP) .............................. 2003-347927
Sep. 17, 2004 (JP) .............................. 2004-271906

(51) Int. Cl.
*G02F 1/1335* (2006.01)

(52) U.S. Cl. .................... 349/106; 349/96; 359/891
(58) Field of Classification Search .............. 349/96, 349/106; 359/885, 891, 892; 345/88; 428/1.3, 428/1.31; 430/7
See application file for complete search history.

(56) References Cited

U.S. PATENT DOCUMENTS 5,374,493 A 12/1994 Fukunaga et al.
2005/0030448 A1 2/2005 Huh et al.

FOREIGN PATENT DOCUMENTS

| JP | 8-171014 | 7/1996 |
|----|----------|--------|
| JP | 11-6911 | 1/1999 |
| JP | 2001-188120 | 7/2001 |
| JP | 2001-194658 | 7/2001 |
| JP | 2003-255325 | 9/2003 |
| JP | 2003-255336 | 9/2003 |

*Primary Examiner*—Toan Ton
*Assistant Examiner*—Tai Duong
(74) *Attorney, Agent, or Firm*—Birch, Stewart, Kolasch & Birch, LLP (57) ABSTRACT

A color filter of the present invention includes a large number of colored layers of a plurality of colors regularly arranged together. The color filter is such that $$x_{WH}-0.05 \leq x_B \leq x_{WH}+0.05 \text{ and } y_{WH}-0.05 \leq y_B \leq y_{WH}+0.05$$

or $$x_{WH}-0.10 \leq x_B \leq x_{WH} \text{ and } y_{WH}-0.10 \leq y_B \leq y_{WH}$$

is satisfied, where ($x_{WH}$, $y_{WH}$) is the chromaticity in the CIE 1931 chromaticity diagram when the filter alone is irradiated with light to produce a white display, and ($x_B$, $y_B$) is the chromaticity in the CIE 1931 chromaticity diagram when the filter is irradiated with the same light while being interposed between a pair of polarization plates arranged in a crossed Nicols state each having a degree of polarization of 99.98% or more.

8 Claims, 8 Drawing Sheets

COLOR FILTER AND LIQUID CRYSTAL DISPLAY DEVICE USING THE SAME

CROSS REFERENCE TO RELATED APPLICATION

This nonprovisional application claims priority under 35 U.S.C. §119(a) on Patent Application No. 2003-347927 filed in Japan on Oct. 7, 2003, and Patent Application No. 2004-271906 filed in Japan on Sep. 17, 2004, and is a Division of U.S. application Ser. No. 10/958,387, filed Oct. 6, 2004 now U.S. Pat. No. 7,248,313 the entire contents of which are hereby incorporated by reference.

BACKGROUND OF THE INVENTION

1. Field of the Invention

The present invention relates to a color filter and a liquid crystal display device using the same.

2. Description of the Background Art

In a liquid crystal display device capable of displaying color images, a color filter including a large number of red, green and blue colored layers regularly arranged together is provided on the display-surface-side substrate. The pigment dispersion method has been a mainstream method for manufacturing a color filter because the method is superior in terms of heat resistance, light resistance and cost. However, as compared with the dyeing method using dyes, the pigment dispersion method is inferior in terms of the depolarization of pigment particles.

For example, Japanese Laid-Open Patent Publication No. 11-6911 states that color filters manufactured by the pigment dispersion method are inferior in terms of the depolarization, as compared with those manufactured by the dyeing method, because of scattering of light occurring due to pigment particles and surface configuration, that the amount of light transmitted is reduced by the scattering of light, thus failing to obtain sufficient brightness for the same chromaticity, and that the chromaticity of a combination color shifts if the transmittance decreases for even just one of red, blue and green, depending on the degree of scattering. In view of this, a technique has been disclosed in the art in which an ink receiving layer made of a photosensitive resin composition is subjected to a pattern exposure process to form non-colored portions, and a colored ink is applied onto the unexposed portions using an inkjet head to color the unexposed portions, after which the colored portions are subjected to an air flow or vacuum drying, and then the entire ink receiving layer is cured.

Japanese Laid-Open Patent Publication No. 08-171014 is directed to an improvement through yellow added to red and green. Specifically, the gray-scale display is improved through an increase in the contrast ratio of the color filter by using a color resist in which yellow is added to red and green colored compositions while reducing the particle size of the pigment in the colored composition by using a benzimidazolone derivative as the dispersant. However, the publication fails to disclose specific gray-scale display data and fails to describe the chromaticity in a black display.

Japanese Laid-Open Patent Publication No. 2001-188120 discloses a colored composition for a color filter including at least a pigment, a polymer and a solvent, in which the content of a yellow pigment in the pigment component is 30% by weight or more and the relative surface area of the yellow pigment is 70 m²/g or more. The publication states that by optimizing the relative surface area of the yellow pigment, it is possible to form a colored film having a high contrast ratio and to obtain a color filter having a high display quality.

Japanese Laid-Open Patent Publication No. 2001-194658 discloses a liquid crystal display device including a pair of opposing substrates and a liquid crystal material sealed therebetween, with a color filter including red, green and blue color patterns being formed on one substrate, in which an adjustment is made so that CR1/CR2≦.6, where CR1 is the contrast ratio of the color pattern of the highest contrast ratio and CR2 is that of the color pattern of the smallest contrast ratio while the contrast ratio of the panel is 400 or more, thereby improving the color reproducibility.

In recent years, the contrast and the luminance of liquid crystal display device have been increased. This has led to cause a problem that light leakage of a color, e.g., magenta, is observed in a black display, and the magenta color in a black display can be quite conspicuous. This problem is particularly pronounced with liquid crystal display devices having a high contrast ratio and a high backlight brightness, e.g., LCD televisions.

Note that Japanese Laid-Open Patent Publication No. 08-171014, supra, only discloses improvements on the red and green colored layers and fails to give limitations on the blue colored layer. Thus, it is difficult with such a disclosure to realize a desirable black display.

SUMMARY OF THE INVENTION

It is therefore an object of the present invention to provide a color filter with which it is possible to prevent conspicuous coloring in a black display due to light leakage, and a liquid crystal display device using the same.

A color filter the present invention, which achieves the object set forth above, is a color filter including a large number of colored layers of a plurality of colors regularly arranged together, wherein:

$$x_{WH}-0.05 \leq x_B \leq x_{WH}+0.05 \text{ and } y_{WH}-0.05 \leq y_B \leq y_{WH}+0.05$$

or $$x_{WH}-0.10 \leq x_B \leq x_{WH} \text{ and } y_{WH}-0.10 \leq y_B \leq y_{WH}$$

is satisfied, where $(x_{WH}, y_{WH})$ is a chromaticity in a CIE 1931 chromaticity diagram when the filter alone is irradiated with light to produce a white display, and $(x_B, y_B)$ is a chromaticity in the CIE 1931 chromaticity diagram when the filter is irradiated with the same light while being interposed between a pair of polarization plates arranged in a crossed Nicols state each having a degree of polarization of 99.98% or more.

Herein, the term "CIE 1931 chromaticity diagram" refers to a chromaticity diagram based on a CIE color system using color matching functions, which was adopted in 1931 by CIE (Commission Internationale d'Eclairage).

Another color filter of the present invention is a color filter including colored layers of a number n of colors regularly arranged together, wherein:

$$\frac{1}{2} \times \frac{Y_{max}}{Y'_{max}} \leq \frac{Y_{min}}{Y'_{min}}$$

is satisfied, where $Y_i$ (i=1 to n) is a luminance of the colored layers of the n colors when the filter alone is irradiated with light, $Y_i'$ (i=1 to n) is a luminance of the colored layers of the n colors when the filter is irradiated with the same light while being interposed between a pair of polarization plates arranged in a crossed Nicols state each having a degree of polarization of 99.98% or more, $Y_{max}/Y_{max}'$ is a maximum value of $Y_i/Y_i'$, and $Y_{min}/Y_{min}'$ is a minimum value of $Y_i/Y_i'$, and $$\frac{Y_{WH}}{Y_B} \geq 4000$$

is satisfied, where $Y_{WH}$ is a luminance when the filter alone is irradiated with light to produce a white display, and $Y_B$ is a luminance when the filter is irradiated with the same light while being interposed between a pair of polarization plates arranged in a crossed Nicols state each having a degree of polarization of 99.98% or more and a transmittance of 36% when arranged in a parallel position.

BRIEF DESCRIPTION OF THE DRAWINGS

Other objects, features and advantages of the present invention will become apparent from the following detailed description, taken in conjunction with the accompanying drawings, wherein.

DETAILED DESCRIPTION OF THE PREFERRED EMBODIMENTS

An embodiment of the present invention will now be described.

(Color Filter And Liquid Crystal Display Device)

The present inventors have found that coloring in a black display is caused by the depolarization being different for each color of the colored layer of the color filter. For example, in a liquid crystal display device using a color filter having colored layers of three colors, i.e., red, green and blue, magenta coloring in a black display is observed because the depolarization for green is better than those for the other colors, i.e., because the contrast ratio for green is higher than those for the other colors, as shown in Table 1 below, and there is less light leakage for green than for red and blue in a black display, resulting in the complementary color (magenta) being observed.

TABLE 1

|  | Red (R) | Green (G) | Blue (B) |
|---|---|---|---|
| Single color contrast ratio (Y/Y') | 2821 | 7302 | 5102 |

Thus, according to the present invention, coloring in a black display is reduced by making an adjustment such that the ratio of the light amount in a black display between the individual colors of the colored layers of the color filter is substantially within a certain range, as opposed to simply improving the depolarization of the color filter to improve the contrast ratio thereof, or improving the decrease in the transmittance due to scattering by the color filter.

A color filter of the first configuration of the present invention is a color filter including a large number of colored layers of a plurality of colors regularly arranged together, wherein:

$$x_{WH}-0.05 \leq x_B \leq x_{WH}+0.05 \text{ and } y_{WH}-0.05 \leq y_B \leq y_{WH}+0.05$$

or $$x_{WH}-0.10 \leq x_B \leq x_{WH} \text{ and } y_{WH}-0.10 \leq y_B \leq y_{WH}$$

is satisfied, where $(x_{WH}, y_{WH})$ is the chromaticity in the CIE 1931 chromaticity diagram when the filter alone is irradiated with light to produce a white display, and $(x_B, y_B)$ is the chromaticity in the CIE 1931 chromaticity diagram when the filter is irradiated with the same light while being interposed between a pair of polarization plates arranged in a crossed Nicols state each having a degree of polarization of 99.98% or more.

A color filter adjusted as described above and interposed between a pair of polarization plates arranged in a crossed Nicols state each having a degree of polarization of 99.98% or more has a close-to-white chromaticity or a bluish dark chromaticity, and does not have conspicuous coloring. A liquid crystal display device produces colors dominantly by its color filter. Therefore, when such a color filter as described above is used in a liquid crystal display device, the liquid crystal display device will have a close-to-white chromaticity or a bluish dark chromaticity in a black display, thus preventing conspicuous coloring.

Since the pair of polarization plates arranged in a crossed Nicols state each have a degree of polarization of 99.98% or more, they do not affect the evaluation of light leakage of the color filter itself. If a polarization plate having a smaller degree of polarization is used, the polarization plate affects the evaluation of light leakage of the color filter itself so that the measured amount of light leakage is greater than the actual amount of light leakage, thereby making it difficult to perform an accurate evaluation.

Figure 1:
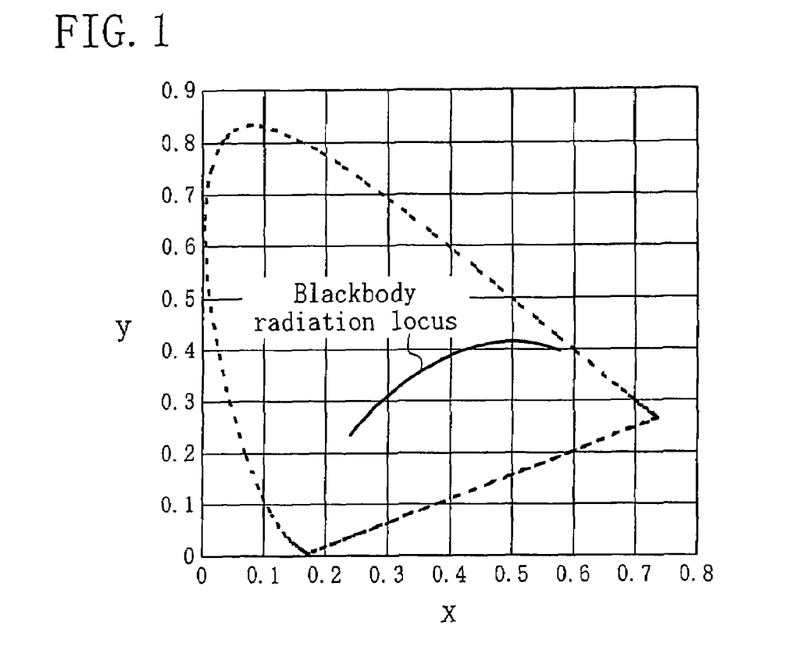
FIG. 1 is a CIE 1931 chromaticity diagram showing the blackbody radiation locus.
Figure 2:
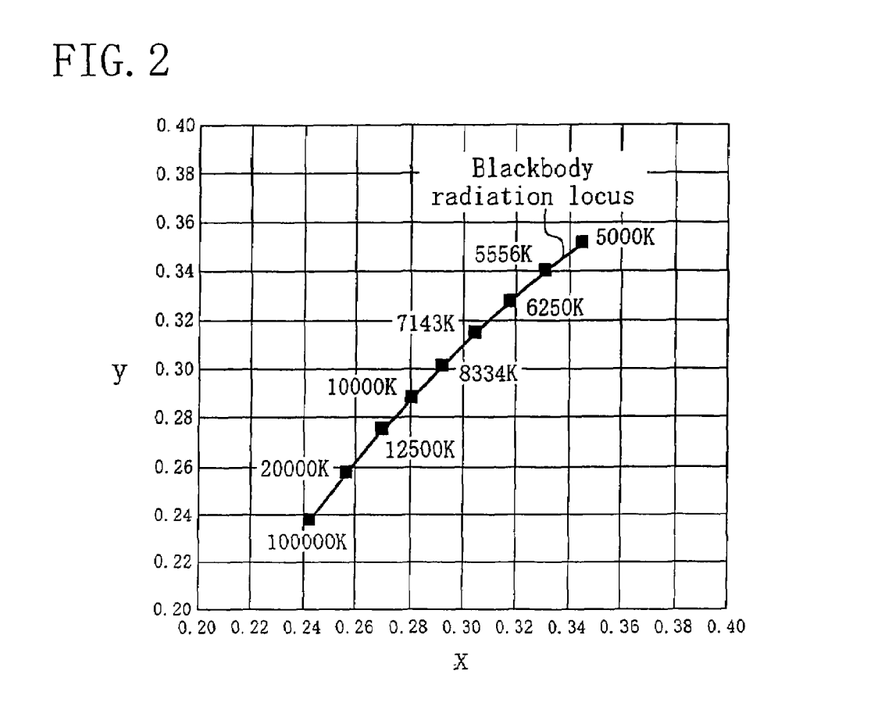
FIG. 2 shows a portion of FIG. 1 on an enlarged scale.

Typically, a liquid crystal display device is designed so that the white display is located on the blackbody radiation locus, and the color temperature is in many cases in the range of 5500 K to 20000 K. FIG. 1 shows the CIE 1931 chromaticity diagram with the blackbody radiation locus, and FIG. 2 is an enlarged view of a portion corresponding to a color temperature range of 5500 K to 20000 K. As can be seen from these figures, in the CIE 1931 chromaticity diagram, the color temperature range of 5500 K to 20000 K corresponds to a straight line between (0.332, 0.342) and (0.256, 0.258) whose gradient is substantially 1. In a chromaticity coordinate range near the blackbody radiation locus, no particular coloring can be perceived. For example, yellowish white is observed at a color temperature of 5500 K, and bluish white at 20000 K. Further away from the blackbody radiation locus in the CIE 1931 chromaticity diagram, particular coloring is perceived, green above the blackbody radiation locus and magenta below the blackbody radiation locus. Thus, when a liquid crystal display device switches from a white display to a black display, conspicuous coloring is less likely to occur if the color is shifted along the blackbody radiation locus in the CIE 1931 chromaticity diagram.

With the color filter of the first configuration, substantially neutral black is perceived in a black display if $$xWH - yWH - 0.03 \leq xB - yB \leq xWH - yWH + 0.03$$

is satisfied. More preferably, $$xWH - 0.05 \leq xB \leq xWH + 0.05 \text{ and } yWH - 0.05 \leq yB \leq yWH + 0.05$$

is satisfied.

Even more preferably, $$x_{WH} - 0.02 \leq x_B \leq x_{WH} + 0.02 \text{ and } y_{WH} - 0.02 \leq y_{WH} + 0.02$$

and $$x_{WH} - y_{WH} - 0.01 \leq x_B - y_B \leq x_{WH} - y_{WH} + 0.01$$

is satisfied.

With a color filter satisfying such a condition, the chromaticity difference between a white display and a black display is small and the shift from the white display to the black display is more closely along the blackbody radiation locus, whereby the black display is perceived to be completely achromatic.

The color filter of the first configuration preferably satisfies $$\frac{Y_{WH}}{Y_B} \geq 4000$$

where $Y_{WH}$ is the luminance when the filter alone is irradiated with light to produce a white display, and $Y_B$ is the luminance when the filter is irradiated with the same light while being interposed between a pair of polarization plates arranged in a crossed Nicols state each having a degree of polarization of 99.98% or more and a transmittance of 36% when arranged in a parallel position.

Figure 3:
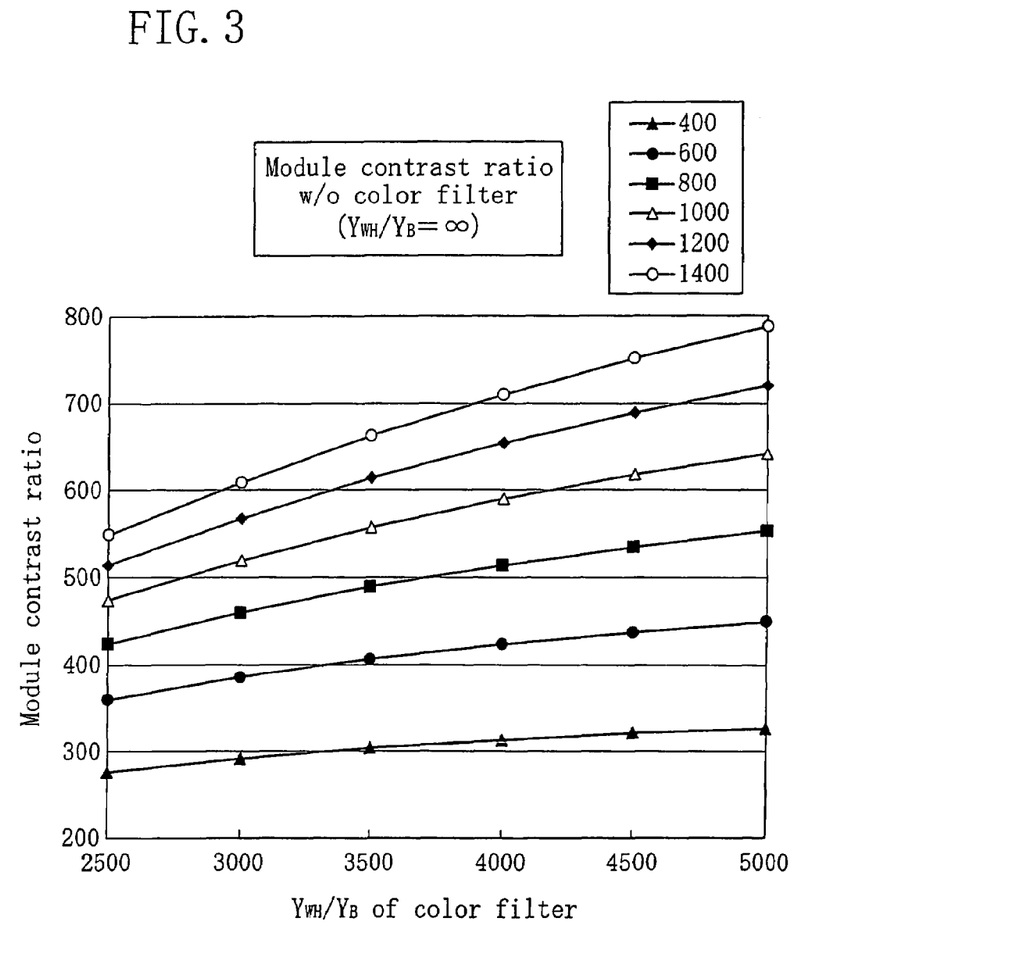
FIG. 3 is a graph showing the relationship between $Y_{WH}/Y_B$ of a color filter and the contrast ratio of a liquid crystal display module.

With such a configuration, it is possible to suppress the luminance increase in a black display by the color filter to a sufficiently practical level. FIG. 3 shows the contrast ratio for each of six liquid crystal display modules having no color filter and having different contrast ratios to which six color filters of different $Y_{WH}/Y_B$ values are respectively attached. As can be seen from the figure, it is possible to easily realize a contrast ratio of 600 or more, which is typically required in a high-contrast liquid crystal display device such as an LCD television, by using a color filter where $Y_{WH}/Y_B \leq 4000$ in combination with a liquid crystal display device whose contrast ratio is 1000 or more in the absence of a color filter.

More preferably, a color filter where $Y_{WH}/Y_B \leq 4400$ is used in combination with a liquid crystal display device whose contrast ratio is 1200 or more in the absence of a color filter, in which case it is possible to obtain a color liquid crystal display device having a contrast ratio of about 700.

In the color filter of the first configuration, the plurality of colors are the three colors of red, green and blue.

The color filter of the second configuration is a color filter including colored layers of a number n of colors regularly arranged together, wherein:

$$\frac{1}{2} \times \frac{Y_{max}}{Y'_{max}} \leq \frac{Y_{min}}{Y'_{min}}$$

is satisfied, where $Y_i$ (i=1 to n) is the luminance of the colored layers of the n colors when the filter alone is irradiated with light, $Y_i'$ (i=1 to n) is the luminance of the colored layers of the n colors when the filter is irradiated with the same light while being interposed between a pair of polarization plates arranged in a crossed Nicols state each having a degree of polarization of 99.98% or more, $Y_{max}/Y_{max}'$ is the maximum value of $Y_i/Y_i'$, and $Y_{min}/Y_{min}'$ is the minimum value of $Y_i/Y_i'$, and $$\frac{Y_{WH}}{Y_B} \geq 4000$$

is satisfied, where $Y_{WH}$ is the luminance when the filter alone is irradiated with light to produce a white display, and $Y_B$ is the luminance when the filter is irradiated with the same light while being interposed between a pair of polarization plates arranged in a crossed Nicols state each having a degree of polarization of 99.98% or more and a transmittance of 36% when arranged in a parallel position.

With a color filter of such a configuration, the ratio between the luminance of the filter alone and the luminance of the filter when interposed between a pair of polarization plates arranged in a crossed Nicols state each having a degree of polarization of 99.98% or more does not substantially vary among the colored layers of n colors, thus preventing colored layers of one color from coloring the output light conspicuously with respect to colored layers of the other colors due to light leakage in a black display.

Moreover, it is possible to suppress the luminance increase in a black display by the color filter to a sufficiently practical level, and it is possible to easily realize a contrast ratio of 600 or more, which is typically required in a high-contrast liquid crystal display device such as an LCD television, by using the color filter in combination with a liquid crystal display device whose contrast ratio is 1000 or more in the absence of a color filter, as shown in FIG. 3.

More preferably, a color filter where $Y_{WH}/Y_B \leq 4400$ is used in combination with a liquid crystal display device whose contrast ratio is 1200 or more in the absence of a color filter, in which case it is possible to obtain a color liquid crystal display device having a contrast ratio of about 700.

In the color filter of the second configuration where the n colors are the three colors of red, green and blue, $$\frac{1}{2} \times \frac{T_G}{T_G'} \leq \frac{T_R}{T_R'} \leq 2 \times \frac{T_G}{T_G'}$$

and $$\frac{1}{2} \times \frac{T_B}{T_B'} \leq \frac{T_G}{T_G'} \leq 2 \times \frac{T_B}{T_B'}$$

and $$\frac{1}{2} \times \frac{T_R}{T_R'} \leq \frac{T_B}{T_B'} \leq 2 \times \frac{T_R}{T_R'}$$

is satisfied, where $T_R$, $T_G$ and $T_B$ are the transmittance values of the red, green and blue colored layers, respectively, when the filter alone is irradiated with light, and $T_R'$, $T_G'$ and $T_B'$ are the transmittance values of the red, green and blue colored layers, respectively, when the filter is irradiated with the same light while being interposed between a pair of polarization plates arranged in a crossed Nicols state each having a degree of polarization of 99.98% or more, and $$\frac{Y_{WH}}{Y_B} \geq 4000$$

is satisfied, where $Y_{WH}$ is the luminance when the filter alone is irradiated with light to produce a white display, and $Y_B$ is the luminance when the filter is irradiated with the same light while being interposed between a pair of polarization plates arranged in a crossed Nicols state each having a degree of polarization of 99.98% or more and a transmittance of 36% when arranged in a parallel position.

With such a configuration, the ratio between the transmittance of the filter alone and the transmittance of the filter when interposed between a pair of polarization plates arranged in a crossed Nicols state does not substantially vary among the red, green and blue colored layers, thus preventing colored layers of one color from coloring the output light conspicuously with respect to colored layers of the other colors due to light leakage in a black display.

The transmittance values $T_R$, $T_G$, $T_B$, $T_R'$, $T_G'$ and $T_B'$ are defined as follows:

$T_R = Y_R/Y_0$, $T_G = Y_G/Y_0$ and $T_B = Y_B/Y_0$, and $T_R' = Y_R'/Y_0$, $T_G' = Y_G'/Y_0$ and $T_B' = Y_B'/Y_0$ where $Y_0$ is the luminance of the measurement light source, $Y_R$, $Y_G$ and $Y_B$ are the luminance values of the red, green and blue colored layers, respectively, as measured when the filter alone is placed over the measurement light source, and $Y_R'$, $Y_G'$ and $Y_B'$ are the luminance values of the red, green and blue colored layers, respectively, as measured when the color filter interposed between a pair of polarization plates arranged in a crossed Nicols state each having a degree of polarization of 99.98% or more is placed over the measurement light source.

A liquid crystal display device of the present invention includes:

a liquid crystal cell including a first substrate, a second substrate provided so as to oppose the first substrate, and a liquid crystal layer provided between the first and second substrates; and a pair of polarization plates arranged in a crossed Nicols state and provided so as to interpose the liquid crystal cell therebetween, wherein a color filter of the first configuration or a color filter of the second configuration is provided on the first substrate.

In a liquid crystal display device of this type without a color filter of the present invention, coloring due to light leakage is significant when the liquid crystal layer of the liquid crystal cell is of a vertical alignment type or when the contrast ratio (the ratio of the transmittance in a direction normal to the display surface in a white display to that in a black display) is 400 or more (even more so when it is 600 or more). Thus, the color filter of the present invention as described above is particularly advantageous.

Note that a colorless transparent resin layer (white) is in some cases provided in place of a colored layer in a color filter in order to ensure sufficient luminance, and a black matrix is typically provided on a color filter. The color filter of the first or second configuration may include the resin layer or the black matrix. Note however that the resin layer or the black matrix is not included as a colored layer of the color filter of the first or second configuration.

(Specific Configurations)

Specific configurations of the present invention will now be described in detail with reference to the drawings.

Figure 4:
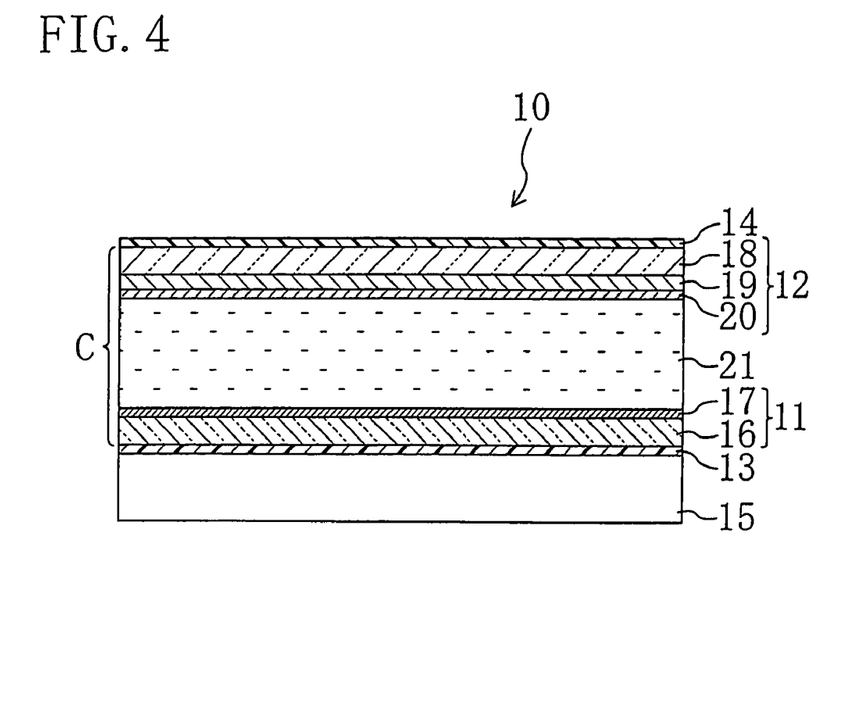
FIG. 4 is a cross-sectional view of a liquid crystal display device according to an embodiment of the present invention.

FIG. 4 shows a liquid crystal display device 10 according to an embodiment of the present invention.

The liquid crystal display device 10 includes a liquid crystal cell C and polarization plates 13 and 14 provided on opposite sides of the liquid crystal cell C. The liquid crystal cell C includes a TFT substrate 11, a color filter substrate (hereinafter referred to as the "CF substrate") 12 provided so as to oppose the TFT substrate 11, and a liquid crystal layer 21 interposed therebetween. Moreover, a backlight 15 is provided on one side of the liquid crystal cell C that is closer to the TFT substrate 11.

The TFT substrate 11 includes a transparent substrate 16, scanning lines and signal lines (not shown) formed on the transparent substrate 16 so as to cross each other to form a lattice pattern, and a pixel electrode 17 being a transparent electrode of ITO (Indium Tin Oxide), IZO (Indium Zinc Oxide), or the like, connected via a TFT (Thin Film Transistor) as a switching element at each intersection between a scanning line and a signal line. The TFT substrate 11 is placed so that the transparent substrate 16 is on the outer side. The pixel electrodes 17 are provided so as to form a matrix as a whole, and each pixel electrode 17 defines one pixel. Note that an alignment film may be provided on one side of the TFT substrate 11 that is to be in contact with the liquid crystal layer 21. The transparent substrate 16 is preferably a glass substrate in view of the heat resistance and the large dimension stability.

The CF substrate 12 includes a transparent substrate 18, a color filter 19 provided so as to form a layer on the transparent substrate 18, and a counter electrode 20 being a transparent electrode made of ITO, IZO, or the like, and provided so as to form a layer on the color filter 19. The CF substrate 12 is placed so that the transparent substrate 18 is on the outer side. The color filter 19 includes a large number of colored layers of a number n of colors (e.g., three colors of red (R), green (G) and blue (B)) regularly arranged together, each colored layer corresponding to one pixel. Note that an alignment film may be provided on one side of the CF substrate 12 that is to be in contact with the liquid crystal layer 21. The transparent substrate 18 is preferably a glass substrate in view of the heat resistance and the large dimension stability. A colorless transparent resin layer (white) may be provided in place of a colored layer in the color filter 19 in order to ensure sufficient luminance, and a black matrix may be provided on a color filter. These elements are not included as colored layers.

The liquid crystal layer 21 is made of a nematic liquid crystal material and is of a vertical alignment type, for example.

The polarization plates 13 and 14 are obtained by drawing in one direction a transparent film such as a polyvinyl alcohol film with iodine or a dye mixed therein, for example. The pair of polarization plates 13 and 14 on opposite sides of the liquid crystal cell C, are arranged in a crossed Nicols state, i.e., so that their polarization axes are perpendicular to each other. The polarization plates 13 and 14 preferably have a degree of polarization of 99% or more.

The backlight 15 includes a fluorescent lamp, a light guide plate, a reflection plate and a diffusion plate, for example, so as to produce a plane emission of light from the fluorescent lamp, thereby uniformly providing light to the entire surface of the liquid crystal cell C.

The liquid crystal display device 10 operates as follows. In each pixel defined by the pixel electrode 17, a predetermined voltage is applied between the pixel electrode 17 and the counter electrode 20 so as to modulate the orientation of the liquid crystal molecules of the liquid crystal layer 21 to adjust the degree by which light from the backlight 15 is transmitted, whereby the liquid crystal display device 10 as a whole displays an image. In other words, the liquid crystal cell C functions as a light bulb. Colored light is produced by combining together n colors of light, e.g., three light beams of red (R), green (G) and blue (B), adjacent to one another. Moreover, since the liquid crystal layer 21 of the liquid crystal cell C is of a vertical alignment type, it is possible to produce a high-contrast display with the contrast ratio (i.e., the ratio of the transmittance in a direction normal to the display surface in a white display to that in a black display) being 400 or more (600 or more, or 700 or more depending on the conditions).

Next, the color filter 19 of the liquid crystal display device 10 will be described in detail.

Figure 5:
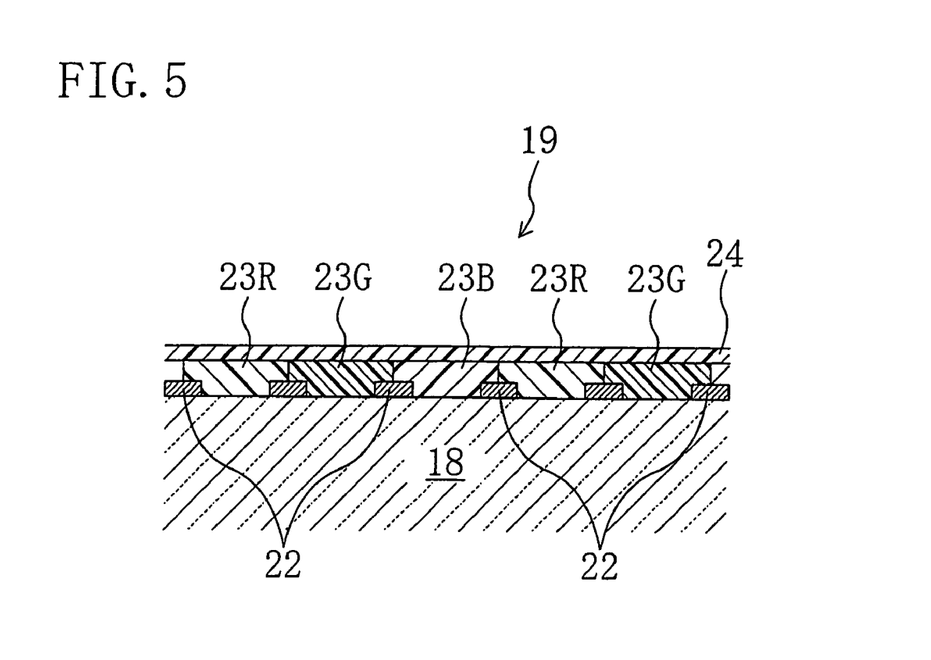
FIG. 5 is a cross-sectional view of a color filter according to an embodiment of the present invention.

FIG. 5 shows an example of the color filter 19 including a large number of colored layers of three colors of red (R), green (G) and blue (B) regularly arranged together.

Specifically, the color filter 19, on the glass substrate 18, a black matrix 22 having openings therein corresponding to the pixels, and red (R), green (G) and blue (B) colored layers 23R, 23G and 23B are provided in the openings of the black matrix 22. The arrangement of the red (R), green (G) and blue (B) colored layers 23R, 23G and 23B is not limited to any particular arrangement, and may be, for example, a stripe arrangement, a mosaic arrangement, etc.

Each of the colored layers 23R, 23G and 23B is, for example, made of a novolac resin or a phenol resin with a phthalocyanine pigment dispersed therein.

First Configuration>

Figure 6A:
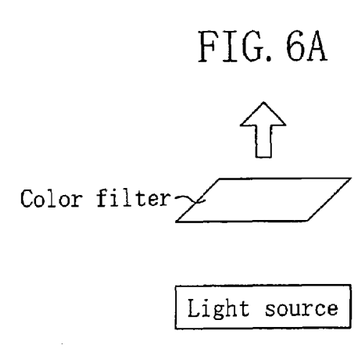
FIG. 6A and FIG. 6B illustrate a method for obtaining the chromaticity and the transmittance ratio of a color filter.
Figure 6B:
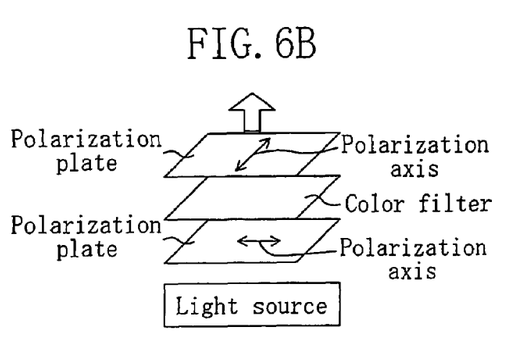
Figure 7:
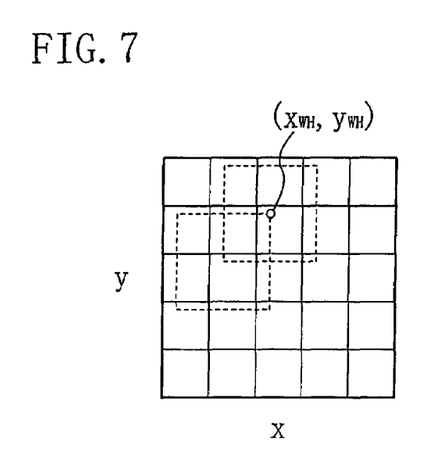
FIG. 7 is a CIE 1931 chromaticity diagram showing the chromaticity of a color filter according to an embodiment of the present invention.

The color filter 19 of the first configuration satisfies $x_{WH}-0.05 \leq x_B \leq x_{WH}+0.05$ and $y_{WH}-0.05 \leq y_B \leq y_{WH}+0.05$ or $x_{WH}-0.10 \leq x_B \leq x_{WH}$ and $y_{WH}-0.10 \leq y_B \leq y_{WH}+0.05$ where $(x_{WH}, y_{WH})$ is the chromaticity in the CIE 1931 chromaticity diagram when the filter alone is irradiated with light to produce a white display, as shown in FIG. 6A, and $(x_B, y_B)$ is the chromaticity in the CIE 1931 chromaticity diagram when the filter is irradiated with the same light while being interposed between a pair of polarization plates arranged in a crossed Nicols state each having a degree of polarization of 99.98% or more, as shown in FIG. 6B. Thus, as shown in the CIE 1931 chromaticity diagram of FIG. 7, $(x_B, y_B)$ is in either area delimited by a dotted line, i.e., an area around $(x_{WH}, y_{WH})$ or an area on the lower left side of $(x_{WH}, y_{WH})$. In the CIE 1931 chromaticity diagram, $(x_B, y_B)$ being in such an area means that the chromaticity, when interposed between a pair of polarization plates arranged in a crossed Nicols state each having a degree of polarization of 99.98% or more, is a close-to-white chromaticity or a bluish dark chromaticity. Therefore, when the liquid crystal display device 10 is producing a black display, coloring occurring due to light leakage is in a color of such a chromaticity. Thus, conspicuous coloring in a black display due to light leakage is prevented.

With the color filter 19, substantially neutral black is perceived in a black display if $x_{WH}-y_{WH}-0.03 \leq x_B-y_B \leq x_{WH}-y_{WH}+0.03$ is satisfied. More preferably, $x_{WH}-0.05 \leq x_B \leq x_{WH}+0.05$ and $y_{WH}-0.05 \leq y_B \leq y_{WH}+0.05$ is satisfied.

Even more preferably, $x_{WH}-0.02 \leq x_B \leq x_{WH}+0.02$ and $y_{WH}-0.02 \leq y_B \leq y_{WH}+0.02$ and $x_{WH}-y_{WH}-0.01 \leq x_B-y_B \leq x_{WH}-y_{WH}+0.01$ is satisfied, in which case the chromaticity difference between a white display and a black display is small and the change from the white display to the black display is more closely along the blackbody radiation locus in the CIE 1931 chromaticity diagram, whereby the black display is perceived to be completely achromatic.

Moreover, the color filter 19 preferably satisfies $$\frac{Y_{WH}}{Y_B} \geq 4000$$

where $Y_{WH}$ is the luminance when the filter alone is irradiated with light to produce a white display, and $Y_B$ is the luminance when the filter is irradiated with the same light while being interposed between a pair of polarization plates arranged in a crossed Nicols state each having a degree of polarization of 99.98% or more and a transmittance of 36% when arranged in a parallel position. In such a case, the contrast ratio of the filter alone is very high, whereby it is possible to suppress the luminance increase in a black display by the color filter 19 to a sufficiently practical level, and if the contrast ratio of the liquid crystal display device 10 in the absence of the color filter 19 is 1000 or more, it is possible to easily realize a contrast ratio of 600 or more, which is typically required in a high-contrast liquid crystal display device such as an LCD television.

More preferably, $$\frac{Y_{WH}}{Y_B} \geq 4400$$

is satisfied, in which case it is possible to obtain the color liquid crystal display device 10 having a contrast ratio of about 700, if the contrast ratio of the liquid crystal display device 10 in the absence of the color filter 19 is 1200 or more.

Second Configuration>

In the second configuration, the color filter 19 is such that $$\frac{1}{2} \times \frac{Y_{max}}{Y'_{max}} \leq \frac{Y_{min}}{Y'_{min}}$$

is satisfied, where $Y_R$, $Y_G$ and $Y_B$ are the luminance values of the colored layers 23R, 23G and 23B, respectively, when the filter alone is irradiated with light, $Y_R'$, $Y_G'$ and $Y_B'$ are the luminance values of the colored layers 23R, 23G and 23B, respectively, when the filter is irradiated with the same light while being interposed between a pair of polarization plates arranged in a crossed Nicols state each having a degree of polarization of 99.98% or more, $Y_{max}/Y_{max}'$ is the maximum value of the luminance values, and $Y_{min}/Y_{min}'$ is the minimum value thereof, and $$\frac{Y_{WH}}{Y_B} \geq 4000$$

is satisfied, where $Y_{WH}$ is the luminance when the filter alone is irradiated with light to produce a white display, and $Y_B$ is the luminance when the filter is irradiated with the same light while being interposed between a pair of polarization plates arranged in a crossed Nicols state each having a degree of polarization of 99.98% or more and a transmittance of 36% when arranged in a parallel position.

This is equivalent to a state where $$\frac{1}{2} \times \frac{T_G}{T_G'} \leq \frac{T_R}{T_R'} \leq 2 \times \frac{T_G}{T_G'}$$

and $$\frac{1}{2} \times \frac{T_B}{T_B'} \leq \frac{T_G}{T_G'} \leq 2 \times \frac{T_B}{T_B'}$$

and $$\frac{1}{2} \times \frac{T_R}{T_R'} \leq \frac{T_B}{T_B'} \leq 2 \times \frac{T_R}{T_R'}$$

is satisfied, where $T_R$, $T_G$ and $T_B$ are the transmittance values of the red, green and blue colored layers, respectively, when the filter alone is irradiated with light, and $T_R'$, $T_G'$ and $T_B'$ are the transmittance values of the red, green and blue colored layers, respectively, when the filter is irradiated with the same light while being interposed between a pair of polarization plates arranged in a crossed Nicols state each having a degree of polarization of 99.98% or more, and $$\frac{Y_{WH}}{Y_B} \geq 4000$$

is satisfied, where $Y_{WH}$ is the luminance when the filter alone is irradiated with light to produce a white display, and $Y_B$ is the luminance when the filter is irradiated with the same light while being interposed between a pair of polarization plates arranged in a crossed Nicols state each having a degree of polarization of 99.98% or more and a transmittance of 36% when arranged in a parallel position.

The transmittance values $T_R$, $T_G$, $T_B$, $T_R'$, $T_G'$ and $T_B'$ are defined as follows:

$T_R=Y_R/Y_0$, $T_G=Y_G/Y_0$ and $T_B=Y_B/Y_0$, and $T_R'=Y_R'/Y_0$, $T_G'=Y_G'/Y_0$ and $T_B'=Y_B'/Y_0$ where Y0 is the luminance of the measurement light source, $Y_R$, $Y_G$ and $Y_B$ are the luminance values of the red, green and blue colored layers, respectively, as measured when the filter alone is placed over the measurement light source, and $Y_R'$, $Y_G'$ and $Y_B'$ are the luminance values of the red, green and blue colored layers, respectively, as measured when the color filter interposed between a pair of polarization plates arranged in a crossed Nicols state each having a degree of polarization of 99.98% or more is placed over the measurement light source.

In such a case, the ratio between the luminance of the filter alone and the luminance of the filter when interposed between a pair of polarization plates arranged in a crossed Nicols state each having a degree of polarization of 99.98% or more does not substantially vary among the red (R), green (G) and blue (B) colored layers 23R, 23G and 23B, thus preventing the colored layers 23R, 23G or 23B of one color from coloring the output light conspicuously with respect to colored layers of the other colors due to light leakage in a black display.

Moreover, the contrast ratio of the filter alone is very high, whereby it is possible to suppress the luminance increase in a black display by the color filter 19 to a sufficiently practical level, and if the contrast ratio of the liquid crystal display device 10 in the absence of the color filter 19 is 1000 or more, it is possible to easily realize a contrast ratio of 600 or more, which is typically required in a high-contrast liquid crystal display device such as an LCD television.

More preferably, $$\frac{Y_{WH}}{Y_B} \geq 4400$$

is satisfied, in which case it is possible to obtain the color liquid crystal display device 10 having a contrast ratio of about 700, if the contrast ratio of the liquid crystal display device 10 in the absence of the color filter 19 is 1200 or more.

The color filter 19 of the first or second configuration can be manufactured by a method known in the art, such as a spin coat method, a slit coat method or a dry film method, and characteristics as described above can be realized by appropriately selecting and combining stains for the red (R), green (G) and blue (B) colored layers 23R, 23G and 23B.

While coloring due to light leakage in a black display is particularly significant when a high-contrast display is produced, the liquid crystal layer 21 of the liquid crystal cell C of the liquid crystal display device 10 is of a vertical alignment type and the liquid crystal display device 10 produces a high-contrast display with a contrast ratio of 400 or more (600 or more, or 700 or more depending on the conditions). Thus, the effect of using the color filter 19, i.e., to prevent conspicuous coloring in a black display, is particularly advantageous.

While the color filter 19 of the present embodiment has three colors of red (R), green (G) and blue (B) both in the first configuration and in the second configuration, the present invention is not limited to this. Alternatively, the color filter 19 may have six colors of red (R), green (G), blue (B), yellow (Y), cyan (C) and magenta (M) to produce more natural intermediate colors, as disclosed in Japanese Laid-Open Patent Publication No. 2002-286927, for example. Thus, more generally, the color filter 19 may have a number of n colors.

Then, with the first configuration, as with the three-color configuration, $$x_{WH} - 0.05 \leq x_B \leq x_{WH} + 0.05 \text{ and } y_{WH} - 0.05 \leq y_B \leq y_{WH} + 0.05$$

or $$x_{WH} - 0.10 \leq x_B \leq x_{WH} \text{ and } y_{WH} - 0.10 \leq y_B \leq y_{WH}$$

is satisfied, where $(x_{WH}, y_{WH})$ is the chromaticity in the CIE 1931 chromaticity diagram when the filter alone is irradiated with light to produce a white display, and $(x_B, y_B)$ is the chromaticity in the CIE 1931 chromaticity diagram when the filter is irradiated with the same light while being interposed between a pair of polarization plates arranged in a crossed Nicols state each having a degree of polarization of 99.98% or more.

With the second configuration, $$\frac{1}{2} \times \frac{Y_{max}}{Y'_{max}} \leq \frac{Y_{min}}{Y'_{min}}$$

is satisfied, where $Y_i$ (i=1 to n) is the luminance of the colored layers of the n colors when the filter alone is irradiated with light, $Y_i'$ (i=1 to n) is the luminance of the colored layers of the n colors when the filter is irradiated with the same light while being interposed between a pair of polarization plates arranged in a crossed Nicols state each having a degree of polarization of 99.98% or more, $Y_{max}/Y'_{max}$ is the maximum value of $Y_i/Y_i'$, and $Y_{min}/Y'_{min}$ is the minimum value of $Y_i/Y_i'$, and $$\frac{Y_{WH}}{Y_B} \geq 4000$$

where $Y_{WH}$ is the luminance when the filter alone is irradiated with light to produce a white display, and $Y_B$ is the luminance when the filter is irradiated with the same light while being interposed between a pair of polarization plates arranged in a crossed Nicols state each having a degree of polarization of 99.98% or more and a transmittance of 36% when arranged in a parallel position.

Moreover, while the liquid crystal display device 10 of the present embodiment is of an active matrix type, the present invention is not limited to this, and may alternatively be a passive matrix type liquid crystal display device as long as a color filter is provided.

Moreover, while the liquid crystal layer 21 is of a vertical alignment type in the present embodiment, the present invention is not limited to this, and may alternatively be of a horizontal alignment type.

The following evaluation tests were performed.

[Evaluation Test 1]

(Evaluation of Colored Resist)

A color filter used in a liquid crystal display device having a vertical alignment type liquid crystal layer is required to have high color purity and high transmittance. First, red (R), green (G) and blue (B) colored pigment resists satisfying these conditions were selected, as shown in Table 2 below.

TABLE 2

|  | Color filter alone | | | w/Polarizers (crossed) | |
|---|---|---|---|---|---|
|  | Y | x | y | Y' | Y/Y' = T/T' |
| R1 | 1311 | 0.62 | 0.33 | 0.465 | 2821 |
| R2 | 1187 | 0.65 | 0.33 | 0.335 | 3542 |
| R3 | 1162 | 0.65 | 0.33 | 0.242 | 4800 |
| G1 | 2810 | 0.30 | 0.59 | 0.385 | 7302 |
| G2 | 2685 | 0.30 | 0.60 | 0.428 | 6272 |
| G3 | 2539 | 0.29 | 0.61 | 0.567 | 4477 |
| B1 | 584 | 0.15 | 0.08 | 0.115 | 5102 |
| B2 | 513 | 0.15 | 0.07 | 0.144 | 3557 |
| B3 | 474 | 0.15 | 0.06 | 0.125 | 3780 |

R1, R2 and R3 are the selected red (R) resists, G1, G2 and G3 are the selected green (G) resists, and B1, B2 and B3 are the selected blue (B) resists.

The combination of R1, G1 and B1 is commercially available, with which magenta coloring is conspicuous in a black display.

R2 and R3 use different types of pigments from that of R1 in order to improve the depolarization and increase the color purity. Particularly, R3 uses a refined pigment to improve the depolarization.

Typically, the green (G) pigment is a pigment obtained by combining together a phthalocyanine green pigment and a yellow pigment. The depolarization and the chromaticity can be adjusted by controlling the particle sizes of the phthalocyanine green and yellow pigments and the contents thereof with respect to each other.

For example, G2 is obtained by decreasing the yellow pigment content of G1 so as to increase the color purity while decreasing the value x in the CIE 1931 chromaticity diagram. Since yellow has desirable depolarization, G2 has poor depolarization and has a lower contrast ratio Y/Y' than that of G1.

G3 is a pigment resist using a green pigment and a yellow pigment both having a large particle size so as to intentionally increase the depolarization so that the contrast ratio thereof is close to those of red (R) and blue (B).

Typically, a blue (B) pigment is obtained by combining together a phthalocyanine blue pigment and a violet pigment. However, since a violet pigment has poor depolarization, the contrast ratio decreases as the content of the violet pigment increases. The violet pigment contents of B1, B2 and B3 increase in this order.

Since B2 has a larger violet pigment content than B1, B2 has poorer depolarization.

B3 uses refined pigments for both a phthalocyanine blue pigment and a violet pigment in order to prevent deterioration of the depolarization, thereby maintaining a contrast ratio close to that of B2.

Note that all of the resists described above are negative-type pigment-dispersed resists for spin coat.

(Production of Single-Color Substrate for Evaluation Test)

A single-color substrate for test evaluation was produced as follows for each of the nine negative-type pigment-dispersed resists of R1 to R3, G1 to G3 and B1 to B3.

First, a resist to be evaluated was applied onto a transparent glass substrate with a spin coater and dried under a reduced pressure. Then, the entire surface of the resist was irradiated with UV light to be cured, and then developed. Then, the resist was baked to be completely cured to obtain a single-color substrate for test evaluation.

The spin-coating conditions were adjusted so as to obtain desirable color purity after baking. Moreover, a glass substrate similar to that typically used in a liquid crystal display device was used as the glass substrate in order to eliminate the influence of coloring of the glass itself and the influence of scattering due to a difference in the surface condition. The conditions for the drying under a reduced pressure, the UV light irradiation and the development process were set to be the same as those when producing a color filter of a liquid crystal display device. If these conditions are different from those used when producing a color filter, the surface configuration of the colored layers to be evaluated will be different from that of the color filter, whereby accurate measurement may not be done. Table 3 below shows conditions for the production of the single-color substrate for test evaluation.

TABLE 3

| Substrate | Glass AN100 0.7t (Asahi Glass Co., Ltd.) |
|---|---|
| Spin coat | 450 rpm × 10 sec |
| Exposure | 100 mi |
| Development | 1.5% Na$_2$CO$_3$/NaHCO$_3$ |
| Baking | 230° C. × 60 min |

(Evaluation Test Method)

The evaluation test method will be described with reference to FIG. 8 to FIG. 10.

Figure 8:
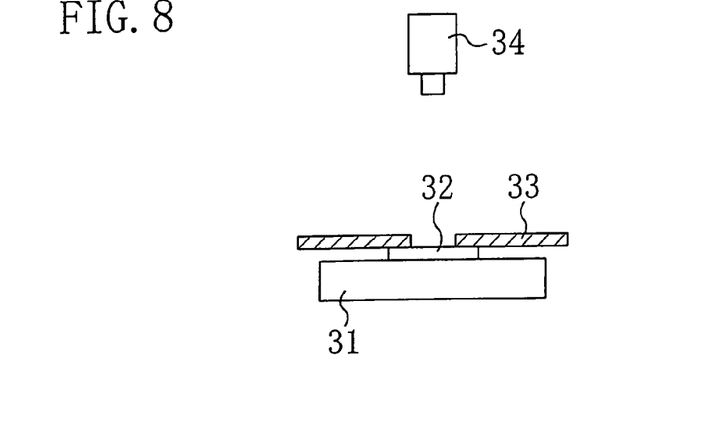
FIG. 8 illustrates a method for evaluating the luminance and the chromaticity of a color filter alone.

Referring to FIG. 8, for each resist, a single-color substrate 32 for test evaluation was placed over, and parallel to, a backlight unit 31, and a light blocking object 33 was placed over the single-color substrate 32 for blocking surrounding light leakage. A spectroradiometer 34 ("SR-3" manufactured by Topcon Corporation) was fixed above the single-color substrate 32, and the backlight unit 31 was turned ON to measure the luminance $Y_{WH}$ and the chromaticity ($x_{WH}$, $y_{WH}$) with the spectroradiometer 34. The backlight unit 31 was similar to that used as the light source in a liquid crystal display device. Specifically, the backlight unit 31 was a 3-wavelength fluorescent lamp having a luminance Y of 5087, and a chromaticity (x, y) of (0.300,0.270) in the CIE 1931 chromaticity diagram. Note that the chromaticity was measured in order to confirm that an intended color density is realized.

Figure 9:
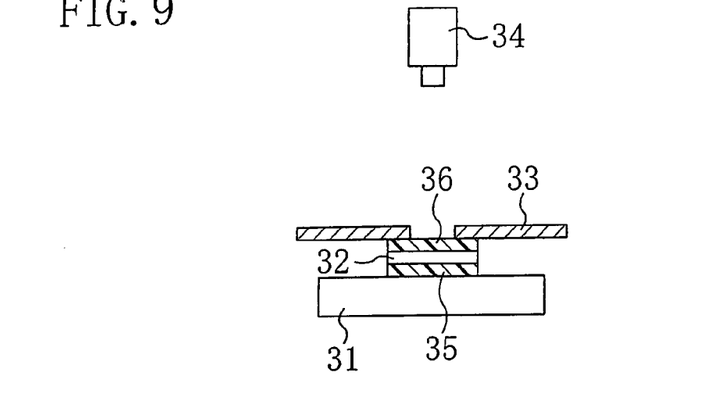
FIG. 9 illustrates a method for evaluating the luminance and the chromaticity of a color filter with a polarization plate attached thereto.

Then, referring to FIG. 9, for each resist, a reverse-side polarization plate 35 and a surface-side polarization plate 36 were attached to the single-color substrate 32 for test evaluation so as to be arranged in a crossed Nicols state, the single-color substrate 32 was placed over, and parallel to, the backlight unit 31, and the light blocking object 33 was placed over the single-color substrate 32 for blocking surrounding light leakage. The spectroradiometer 34 ("SR-3" manufactured by Topcon Corporation) was fixed above the single-color substrate 32, and the backlight unit 31 was turned ON to measure the luminance Y' with the spectroradiometer 34.

Figure 10:
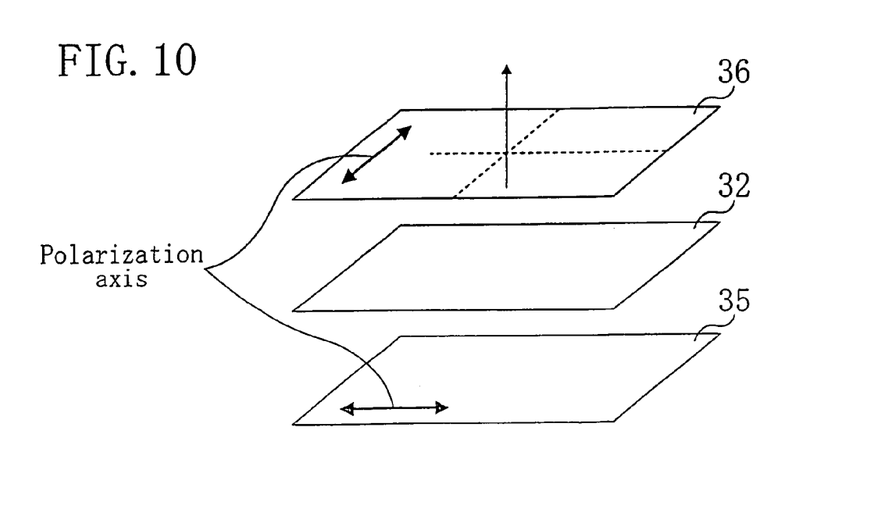
FIG. 10 shows an arrangement of a color filter and a pair of polarization plates.

In this process, the reverse-side polarization plate 35 and the surface-side polarization plate 36 were attached directly to the single-color substrate 32 for test evaluation on the resist colored side and on the glass side, respectively, so that the polarization plates 35 and 36 were arranged in a crossed Nicols state, as shown in FIG. 10. The reverse-side polarization plate 35 and the surface-side polarization plate 36 were both a polarization plate for a vertical alignment type liquid crystal layer with a degree of polarization of 99.98% having characteristics as shown in Table 4 below (manufactured by Nitto Denko Corporation).

TABLE 4

| Luminance w/polarizers (parallel) | Luminance w/ polarizers (crossed) | Luminance ratio | Deg. of polarization |
|---|---|---|---|
| 1824 | 0.303 | 6026 | 99.98% |

(Evaluation Test Results)

The luminance $Y_{WH}$, the chromaticity ($x_{WH}$, $y_{WH}$) and the luminance Y' of the nine negative-type pigment-dispersed resists of R1 to R3, G1 to G3 and B1 to B3 are shown in Table 2 above.

Four color filters were produced using different combinations of one of R1 to R3, one of G1 to G3 and one of B1 to B3 to obtain Example 1 (R1, G1, B1), Example 2 (R2, G2, B2), Example 3 (R2, G3, B3) and Example 4 (R3, G3, B3), and the four color filters were evaluated as to whether $$\frac{1}{2} \times \frac{T_G}{T'_G} \leq \frac{T_R}{T'_R} \leq 2 \times \frac{T_G}{T'_G}$$

and $$\frac{1}{2} \times \frac{T_B}{T'_B} \leq \frac{T_G}{T'_G} \leq 2 \times \frac{T_B}{T'_B}$$

and $$\frac{1}{2} \times \frac{T_R}{T'_R} \leq \frac{T_B}{T'_B} \leq 2 \times \frac{T_R}{T'_R}$$

is satisfied. The results are shown in Table 5 below.

TABLE 5

| | Combination | | | T/T'(=Y/Y') | | | |
|---|---|---|---|---|---|---|---|
| | R | G | B | $T_R/T_R'$ | $T_G/T_G'$ | $T_B/T_B'$ | Eval. |
| Ex 1 | R1 | G1 | B1 | 2821 | 7302 | 5102 | X |
| Ex 2 | R2 | G2 | B2 | 3542 | 6272 | 3557 | ○ |
| Ex 3 | R2 | G3 | B3 | 3542 | 4477 | 3780 | ◎ |
| Ex 4 | R3 | G3 | B3 | 4800 | 4477 | 3780 | ◎ |

It can be seen from Table 5 that Examples 2, 3 and 4 all satisfy the condition above. Moreover, it can be seen that Examples 3 and 4 are superior to Example 2 because the Y/Y' variation among different colors is less significant.

Figure 11:
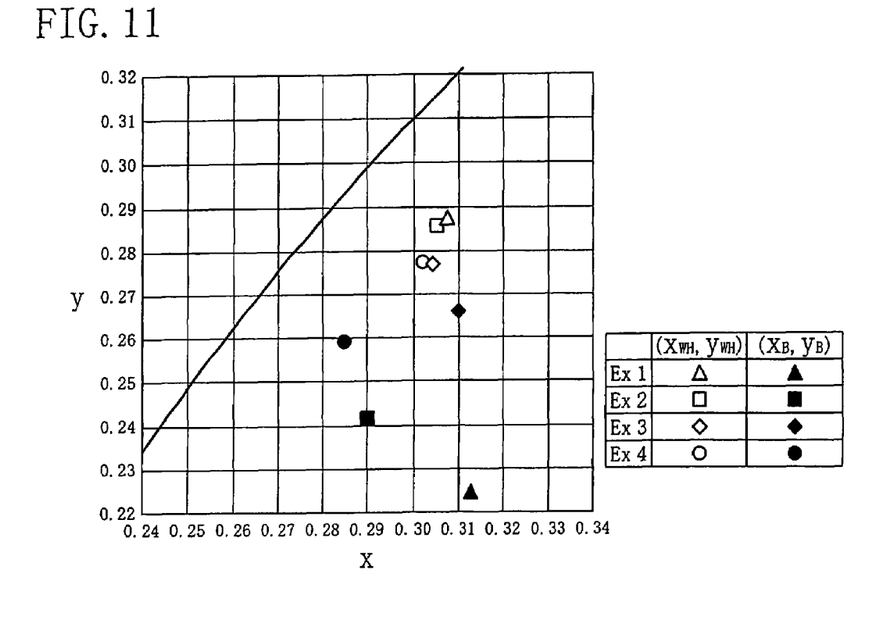
FIG. 11 is a CIE 1931 chromaticity diagram showing the chromaticity in a white display and that in a black display for color filters of Examples 1 to 4.

Next, the color filters of Examples 1 to 4 were examined for the luminance $Y_{WH}$ and the chromaticity ($x_{WH}$, $y_{WH}$) in the CIE 1931 chromaticity diagram when the filter alone was irradiated with light to produce a white display, and the luminance $Y_B$ and the chromaticity ($x_B$, $y_B$) in the CIE 1931 chromaticity diagram when the filter was irradiated with the same light while being interposed between a pair of polarization plates arranged in a crossed Nicols state each having a degree of polarization of 99.98%. The color filters were evaluated as to whether $$x_{WH}-0.05 \leq x_B \leq x_{WH}+0.05 \text{ and } y_{WH}-0.05 \leq y_B \leq y_{WH}+0.05$$

or $$x_{WH}-0.10 \leq x_B \leq x_{WH} \text{ and } y_{WH}-0.10 \leq y_B \leq y_{WH}$$

is satisfied. The results are shown in FIG. 11. Table 6 shows the measured values and the results.

TABLE 6

|      | Filter alone | | | w/Polarizers (crossed) | | | Evaluation | | | $Y_{WH}/Y_B$ |
|------|------|------|------|------|------|------|------|------|------|------|
|      | $Y_{WH}$ | $x_{WH}$ | $y_{WH}$ | $Y_B$ | $x_B$ | $y_B$ | $x_B - x_{WH}$ | $y_B - y_{WH}$ | Eval. | |
| Ex 1 | 1141 | 0.308 | 0.288 | 0.234 | 0.313 | 0.225 | 0.005 | −0.063 | X | 4880 |
| Ex 2 | 1057 | 0.305 | 0.286 | 0.220 | 0.290 | 0.241 | −0.015 | −0.044 | ○ | 4803 |
| Ex 3 | 1010 | 0.304 | 0.277 | 0.249 | 0.310 | 0.266 | 0.006 | −0.011 | ⊙ | 4052 |
| Ex 4 | 1012 | 0.304 | 0.277 | 0.227 | 0.285 | 0.259 | −0.019 | −0.018 | ⊙ | 4465 |

In the color filter of Example 1, $y_B - y_{WH} = -0.063$, the absolute value of which exceeds 0.05. Visual observation showed that there was significant magenta coloring in a black display.

In contrast, in the color filter of Example 2, $y_B - y_{WH} = -0.044$, the absolute value of which is smaller than that of Example 1. Visual observation showed that coloring in a black display was reduced to a practical level.

In the color filter of Example 3, $x_B - x_{WH} = 0.006$ and $y_B - y_{WH} = -0.011$, the absolute values of which are sufficiently small. Visual observation showed that substantially no coloring was perceived in a black display, which was very close to being completely achromatic.

In the color filter of Example 4, $x_B - x_{WH} = -0.019$ and $y_B - y_{WH} = -0.018$. Although the absolute value of $x_B - x_{WH}$ was larger than that of Example 3, the condition $$x_{WH} - 0.02 \leq x_B \leq x_{WH} + 0.02 \text{ and } y_{WH} - 0.02 \leq y_B \leq y_{WH} + 0.02$$

and $$x_{WH} - y_{WH} - 0.01 \leq x_B - y_B \leq x_{WH} - y_{WH} + 0.01$$

was satisfied, and visual observation showed that substantially no coloring was perceived in a black display, which was very close to being completely achromatic.

Liquid crystal display devices were produced using the color filters of Examples 1, 2, 3 and 4. A vertical alignment type liquid crystal layer was used. The backlight was not the same one as that used in the evaluation test, but the chromaticity thereof was adjusted to be around (0.29, 0.30) in the CIE 1931 chromaticity diagram. A pair of polarization plates whose degree of polarization was 99.98% were used. The liquid crystal display device all had contrast ratios of 600 or more, and luminance values of 450 cd or more in a white display.

Figure 12:
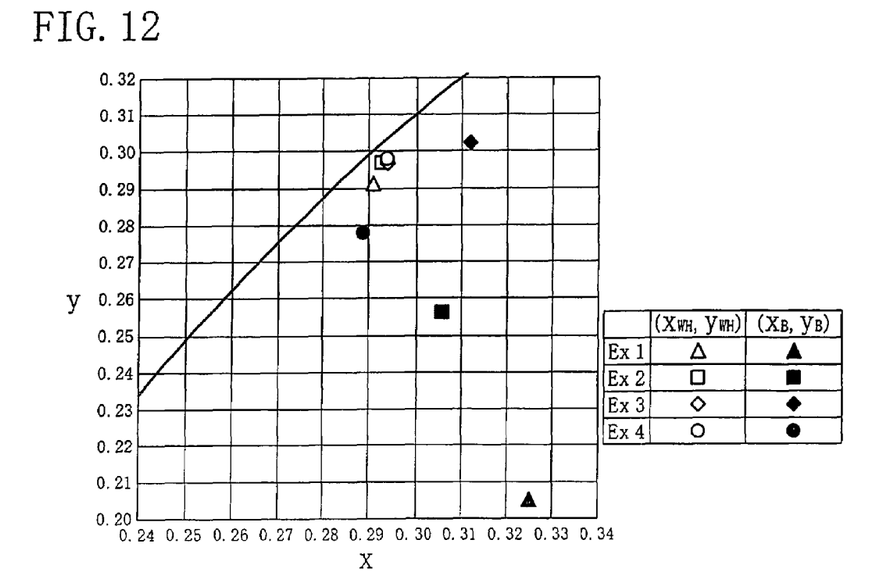
FIG. 12 is a CIE 1931 chromaticity diagram showing the chromaticity in a white display and that in a black display for liquid crystal display devices using the color filters of Examples 1 to 4.

The white display chromaticity and the black display chromaticity of these liquid crystal display devices are shown in FIG. 12. Table 7 shows, in addition to those chromaticity values, the values of $x_B - x_{WH}$ and $y_B - y_{WH}$, and the results of visual observation.

TABLE 7

|      | White display chromaticity | | Black display chromaticity | | Chromaticity difference (white to black) | | Evaluation | | Display device | |
|------|------|------|------|------|------|------|------|------|------|------|
|      | $x_{WH}$ | $y_{WH}$ | $x_B$ | $y_B$ | $x_B - x_{WH}$ | $y_B - y_{WH}$ | Black display as visually observed | Eval. | $x_0$ | $y_0$ |
| Ex 1 | 0.291 | 0.291 | 0.325 | 0.205 | 0.034 | −0.086 | Magenta | X | 0.271 | 0.255 |
| Ex 2 | 0.293 | 0.297 | 0.306 | 0.256 | 0.013 | −0.041 | Slightly magenta | ○ | 0.294 | 0.273 |
| Ex 3 | 0.294 | 0.297 | 0.312 | 0.302 | 0.018 | 0.005 | Substantially achromatic | ⊙ | 0.294 | 0.273 |
| Ex 4 | 0.294 | 0.298 | 0.289 | 0.278 | −0.005 | −0.020 | Completely achromatic | ⊙ | 0.293 | 0.272 |

With both of the liquid crystal display devices using the color filters of Examples 3 and 4, it was possible to produce a black display close to being completely achromatic. Particularly, with the liquid crystal display device using the color filter of Example 4, it was possible to produce a black display completely achromatic and with a chromaticity close to that in a white display.

Figure 13:
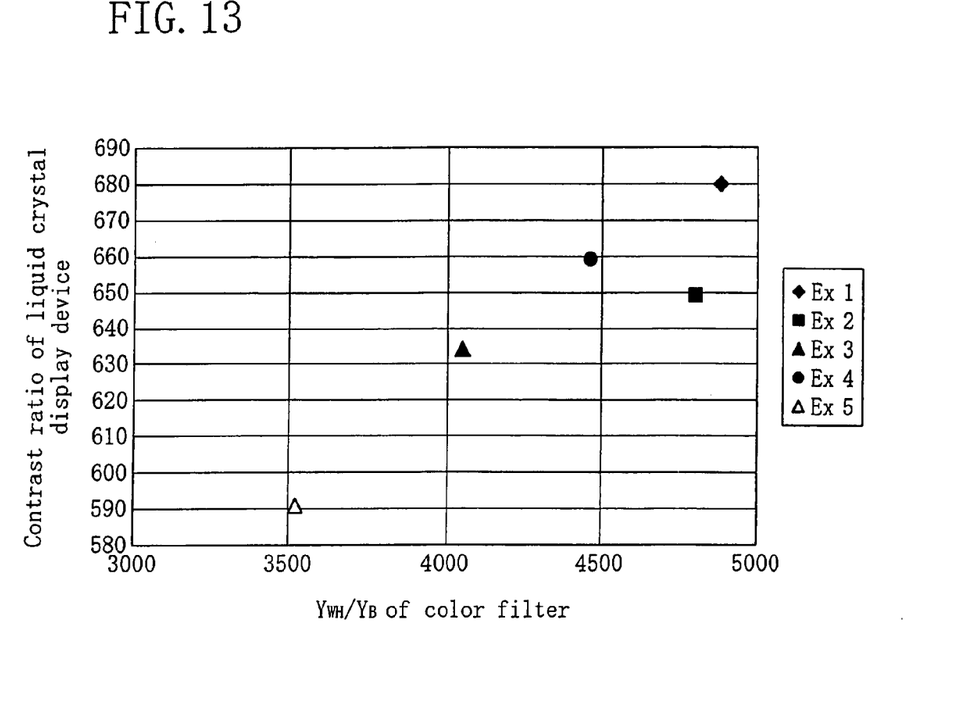
FIG. 13 is a graph showing the relationship between $Y_{WH}/Y_B$ of a color filter and the contrast ratio of a liquid crystal display device.

Another liquid crystal display device was produced using a color filter of Example 5 (reference example) with $Y_{WH}/Y_B$ lower than those of Examples 1 to 4. The contrast ratio of the liquid crystal display device was measured. The results are shown in FIG. 13 and Table 8 below.

TABLE 8

|      | $Y_{WH}/Y_B$ of color filter | Contrast ratio of display device |
|------|------|------|
| Ex 1 | 4880 | 680 |
| Ex 2 | 4803 | 650 |
| Ex 3 | 4052 | 630 |
| Ex 4 | 4465 | 660 |
| Ex 5 | 3520 | 590 |

With the liquid crystal display devices using the color filters of Examples 1 to 4 where $Y_{WH}/Y_{B>4000}$, the contrast ratio was 600 or more, and a high display quality with a solid black color was realized. Particularly, with Examples 1, 2 and 4 where $Y_{WH}/Y_{B>4400}$, a high contrast ratio of 650 or more was obtained. In contrast, in Example 5 where the value $Y_{WH}/Y_B$ is as low as 3520, the contrast ratio was less than 600, resulting in an un-solid black color and a lower display quality than those of Examples 1 to 4.

[Evaluation Test 2]

Next, Evaluation Test 2 will be described.

(Evaluation Test Samples)

Four color filters of Examples 6 to 9 were produced using different combinations of stains for the red (R), green (G) and blue (B) colored layers.

(Evaluation Test Method)

Chromaticity>

Examples 6 to 9 were examined for the chromaticity ($x_{WH}$, $y_{WH}$) in the CIE 1931 chromaticity diagram when the filter alone was irradiated with light to produce a white display, and the chromaticity ($x_B$, $y_B$) in the CIE 1931 chromaticity diagram when the filter was interposed between a pair of polarization plates arranged in a crossed Nicols state each having a degree of polarization of 99.9% or more.

Transmittance Ratio>

Examples 6 to 9 were examined for the transmittance values ($T_R$, $T_G$ and $T_B$) of the red (R), green (G) and blue (B) colored layers when the filter alone was irradiated with light, and the transmittance values ($T_R'$, $T_G'$ and $T_B'$) of the red (R), green (G) and blue (B) colored layers when the filter was irradiated with the same light while being interposed between a pair or polarization plates arranged in a crossed Nicols state each having a degree of polarization of 99.9% or more. Then, the values $T_R/T_R'$, $T_G/T_G'$ and $T_B/T_B'$ were calculated.

(Evaluation Test Results)

FIG. 14(a) to FIG. 14(d) are CIE 1931 chromaticity diagrams showing ($x_{WH}$, $y_{WH}$) and ($x_B$, $y_B$) of Examples 6 to 9, respectively. Note that each area delimited by a dotted line in the figure is an area in which the condition $x_{WH}-0.05 \leq x_B \leq x_{WH}+0.05$ and $y_{WH}-0.05 \leq y_B \leq y_{WH}+0.05$ or $x_{WH}-0.10 \leq x_B \leq x_{WH}$ and $y_{WH}-0.10 \leq y_B \leq y_{WH}$ is satisfied. In these figures, the symbol "○" represents ($x_{WH}$, $y_{WH}$), and the symbol "X" represents ($x_B$, $y_B$).

It can be seen from the figure that Examples 7 to 9 satisfy the condition while Example 6 does not satisfy the condition. In Example 6, ($x_B$, $y_B$) is located on the lower right side of ($x_{WH}$, $y_{WH}$). Therefore, when a liquid crystal display device using Example 6 produces a black display, slightly reddish coloring will be observed. In Example 7, ($x_B$, $y_B$) is located right under ($x_{WH}$, $y_{WH}$), or on the lower left side thereof. Therefore, when a liquid crystal display device using Example 7 produces a black display, bluish coloring will be observed. In Examples 8 and 9, ($x_B$, $y_B$) is located near ($x_{WH}$, $y_{WH}$). Therefore, when a liquid crystal display device using Example 8 or 9 produces a black display, coloring with a chromaticity close to that in a white display will be observed.

These results indicate that color filters of Examples 7 to 9 are preferably used for preventing conspicuous coloring in a black display due to light leakage.

Table 9 below shows the values $T_R/T_R'$, $T_G/T_G'$ and $T_B/T_B'$ of Examples 6 to 9.

Table 10 below shows the values $T_R/T_R'$, $T_G/T_G'$ and $T_B/T_B'$ as normalized with $T_R/T_R'=1$.

TABLE 9

|  | $T_R/T_R'$ | $T_G/T_G'$ | $T_B/T_B'$ |
|---|---|---|---|
| Ex 6 | 1300 | 5600 | 3400 |
| Ex 7 | 1300 | 4000 | 1800 |

TABLE 9-continued

|  | $T_R/T_R'$ | $T_G/T_G'$ | $T_B/T_B'$ |
|---|---|---|---|
| Ex 8 | 2100 | 2800 | 2800 |
| Ex 9 | 2100 | 2400 | 2800 |

TABLE 10

|  | $T_R/T_R'$ | $T_G/T_G'$ | $T_B/T_B'$ |
|---|---|---|---|
| Ex 6 | 1 | 4.3 | 2.6 |
| Ex 7 | 1 | 3.1 | 1.4 |
| Ex 8 | 1 | 1.3 | 1.3 |
| Ex 9 | 1 | 1.1 | 1.3 |

Tables 9 and 10 show that in Example 6, $T_G/T_G'$ and $T_B/T_B'$ are more than twice $T_R/T_R'$, and in Example 7, $T_G/T_G'$ is more than twice $T_R/T_R'$. In contrast, in Examples 8 and 9, $T_G/T_G'$ and $T_B/T_B'$ are both less than twice $T_R/T_R'$, thus satisfying the following condition.

$$\frac{1}{2} \times \frac{T_G}{T_G'} \leq \frac{T_R}{T_R'} \leq 2 \times \frac{T_G}{T_G'}$$

and $$\frac{1}{2} \times \frac{T_B}{T_B'} \leq \frac{T_G}{T_G'} \leq 2 \times \frac{T_B}{T_B'}$$

and $$\frac{1}{2} \times \frac{T_R}{T_R'} \leq \frac{T_B}{T_B'} \leq 2 \times \frac{T_R}{T_R'}$$

Figure 14A:
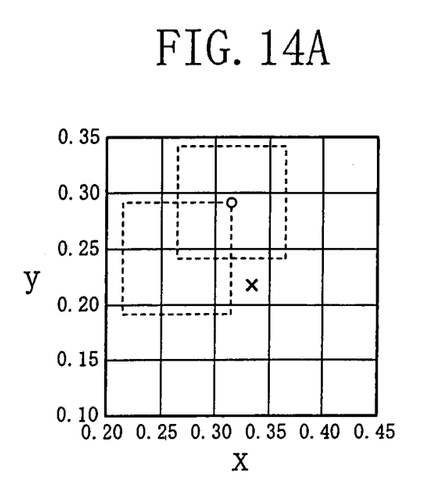
FIG. 14A to FIG. 14D are CIE 1931 chromaticity diagrams showing $(x_{WH}, y_{WH})$ and $(x_B, y_B)$ for Examples 6 to 9, respectively.
Figure 14B:
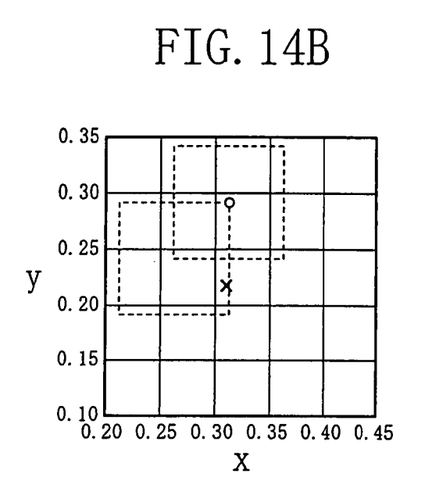
Figure 14C:
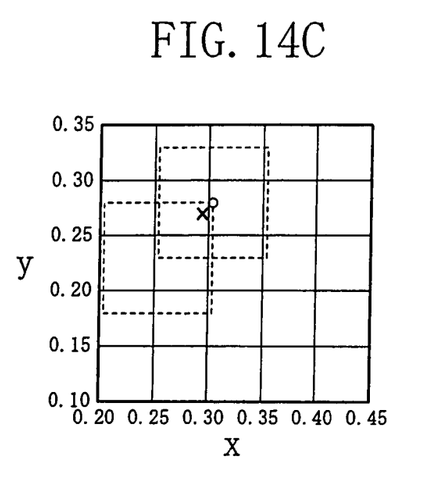
Figure 14D:
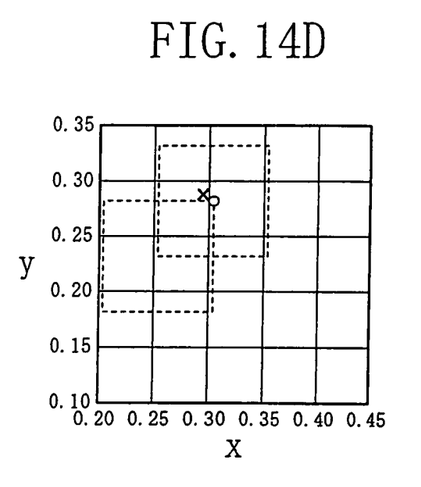

Moreover, FIG. 14(c) and FIG. 14(d) show that in Examples 8 and 9, ($x_B$, $y_B$) is located near ($x_{WH}$, $y_{WH}$).

Black and white are by nature achromatic, and there should be no chromaticity difference therebetween, and they should differ only in luminance, and it is preferred for displaying images with high qualities that the chromaticity does not change between black and white. Thus, it is preferred that the color filters of Examples 8 and 9 are used because ($x_B$, $y_B$) is located near ($x_{WH}$, $y_{WH}$).

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A color filter including a large number of colored layers of a plurality of colors regularly arranged together, wherein:

$x_{WH}-0.05 \leq x_B \leq x_{WH}+0.05$ and $y_{WH}-0.05 \leq y_B \leq y_{WH}+0.05$ or $x_{WH}-0.10 \leq x_B \leq x_{WH}$ and $y_{WH}-0.10 \leq y_B \leq y_{WH}$ is satisfied, where ($x_{WH}$, $y_{WH}$) is a chromaticity in a CIE 1931 chromaticity diagram when the filter alone is irradiated with light to produce a white display, and ($x_B$, $y_B$) is a chromaticity in the CIE 1931 chromaticity diagram when the filter is irradiated with the same light while being interposed between a pair of polarization plates arranged in a crossed Nicols state each having a degree of polarization of 99.98% or more.

2. The color filter of claim 1, wherein:

$$xWH-yWH-0.03 \leq xB-yB \leq xWH-yWH+0.03$$

is satisfied.

3. The color filter of claim 2, wherein:

$$xWH-0.05 \leq xB \leq xWH+0.05 \text{ and } yWH-0.05 \leq yB \leq yWH+0.05$$

is satisfied.

4. The color filter of claim 3, wherein:

$$x_{WH}-0.02 \leq x_B \leq x_{WH}+0.02 \text{ and } y_{WH}-0.02 \leq y_B \leq y_{WH}+0.02$$

and $$x_{WH}-y_{WH}-0.01 \leq x_B-y_B \leq x_{WH}-y_{WH}+0.01$$

is satisfied.

5. The color filter of claim 1, wherein:

$$\frac{Y_{WH}}{Y_B} \geq 4000$$

is satisfied, where $Y_{WH}$ is a luminance when the filter alone is irradiated with light to produce a white display, and $Y_B$ is a luminance when the filter is irradiated with the same light while being interposed between a pair of polarization plates arranged in a crossed Nicols state each having a degree of polarization of 99.98% or more and a transmittance of 36% when arranged in a parallel position.

6. The color filter of claim 5, wherein:

$$\frac{Y_{WH}}{Y_B} \geq 4400$$

is satisfied.

7. The color filter of any one of claims 1 to 6, wherein the plurality of colors are red, green and blue.

8. A liquid crystal display device, comprising:
a liquid crystal cell including a first substrate, a second substrate provided so as to oppose the first substrate, and a liquid crystal layer provided between the first and second substrates, wherein a color filter including a large number of colored layers of a plurality of colors regularly arranged together is provided on the first substrate; and
a pair of polarization plates arranged in a crossed Nicols state and provided so as to interpose the liquid crystal cell therebetween, wherein:
the color filter is such that $$x_{WH}-0.05 \leq x_B \leq x_{WH}+0.05 \text{ and } y_{WH}-0.05 \leq y_B \leq y_{WH}+0.05$$

or $$x_{WH}-0.10 \leq x_B \leq x_{WH} \text{ and } y_{WH}-0.10 \leq y_B \leq y_{WH}$$

is satisfied, where $(x_{WH}, y_{WH})$ is a chromaticity in a CIE 1931 chromaticity diagram when the filter alone is irradiated with light to produce a white display, and $(x_B, y_B)$ is a chromaticity in the CIE 1931 chromaticity diagram when the filter is irradiated with the same light while being interposed between a pair of polarization plates arranged in a crossed Nicols state each having a degree of polarization of 99.98% or more.

* * * * *